(12) United States Patent
Shinohara et al.

(10) Patent No.: US 6,447,958 B1
(45) Date of Patent: Sep. 10, 2002

(54) NON-AQUEOUS ELECTROLYTE BATTERY SEPARATOR

(75) Inventors: Yasuo Shinohara, Niihara-mura; Yoshifumi Tsujimoto, Tsuchiura; Tsuyoshi Nakano, Tsukuba, all of (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 09/299,077

(22) Filed: Apr. 26, 1999

(30) Foreign Application Priority Data

Apr. 27, 1998 (JP) .............................. 10-116838

(51) Int. Cl.⁷ ................................. H01M 2/16
(52) U.S. Cl. ................... 429/248; 429/251; 429/252; 429/254; 429/249
(58) Field of Search ................. 429/142, 144, 429/248, 249, 251, 252, 254, 255, 231.95

(56) References Cited

U.S. PATENT DOCUMENTS 5,023,065 A * 6/1991 Ohno et al.
5,741,608 A * 4/1998 Kojima et al.

FOREIGN PATENT DOCUMENTS

| JP | 59-36939 | 9/1984 |
|---|---|---|
| JP | 59-14494 | 12/1984 |
| JP | 60-52 | 1/1985 |
| JP | 60-136161 | 7/1985 |
| JP | 62-37871 | 2/1987 |
| JP | 63-276868 | 11/1988 |
| JP | 2-46649 | 2/1990 |
| JP | 3-291848 | 12/1991 |
| JP | 4-1692 | 1/1992 |
| JP | 4-112452 | 4/1992 |
| JP | 5-335005 | 12/1993 |
| JP | 7-37571 | 2/1995 |
| JP | 7-78608 | 3/1995 |

* cited by examiner

*Primary Examiner*—John Kim
*Assistant Examiner*—David Sorkin
(74) *Attorney, Agent, or Firm*—Sughrue Mion, PLLC

(57) ABSTRACT

A non-aqueous electrolyte battery separator comprising a heat-resistant nitrogen-containing aromatic polymer and a ceramic powder.

18 Claims, No Drawings

NON-AQUEOUS ELECTROLYTE BATTERY SEPARATOR

BACKGROUND OF THE INVENTION

1. Field of the Invention

The present invention relates to a non-aqueous electrolyte battery separator comprising a heat-resistant nitrogen-containing aromatic polymer and a ceramic powder, and a lithium secondary battery.

2. Description of the Related Art

A lithium primary battery or lithium secondary battery using a non-aqueous electrolyte is highly useful due to its property that high capacity and high energy density are obtained. As a main structure of these batteries, a separator composed of an electrically insulating porous film is intercalated between positive and negative electrodes, an electrolyte solution containing a lithium salt dissolved is impregnated into pores of the film, and the positive electrode and negative electrode and the separator are laminated, or wound in the form of a roll. It is required for a lithium secondary battery to make various safe measures against problems derived from its high capacity and high energy density, for example, large increase in battery temperature because of short-circuit inside and outside of a battery. For solving such problems, there have been made various ideas for the separator.

Particularly, as a safety precaution to which a separator can contribute, shut down property and short circuit property are under notice. Herein, the term shut down (also referred to as fuse) means that battery temperature increases by troubles such as overcharge, external or internal short, a part of a separator is melted to obstruct pores, and current is cut off, and the temperature in this phenomenon is called shut down temperature. The term short circuit means that temperature further increases from the shut down temperature, the separator is melted and a large hole is formed to cause short again, and the temperature in this phenomenon is called short circuit temperature. Decrease in the shut down temperature and increase in short circuit temperature are required for a non-aqueous electrolyte battery separator.

Conventionally, as a separator of a lithium secondary battery, a thin porous film is used, and for example, Celgard (registered trade mark) manufactured by Hoechst Co. is preferably used as a separator of a lithium secondary battery. However, a non-aqueous electrolyte battery separator having further excellent heat-resistance and higher short circuit temperature has been desired.

Regarding a raw material of such a non-aqueous electrolyte battery separator, use of a whole aromatic polyamide-based polymer having excellent heat-resistance has been investigated. For example, Japanese Patent Application Publication (JP-B) No. 59-36939 describes a method for producing a porous film made of an aromatic polymer, that is aromatic polyamide or aromatic polyimide, JP-B No. 59-14494 describes that a method for producing a porous film made of an aromatic polyamide and that it can be used as a battery separator. Further, Japanese Patent Application Laid-Open (JP-A) No. 5-335005 describes use of Normex (registered trade mark) paper (meta-aramid paper) manufactured by du Pont Co. as a separator of a lithium secondary battery. Likewise, JP-A Nos. 7-78608 and 7-37571 also suggest use of non-woven fabric or paper-like sheet made of meta-aramid as a battery separator. Further, JP-A Nos. 62-37871 and 2-46649 describes use of polyimide as a separator of a non-aqueous electrolyte solution battery. In these publications, a material is employed which exhibits excellent ion permeability and battery property while maintaining heat-resistance.

On the other hand, regarding shut down and short circuit, JP-A No. 3-291848 and JP-B No. 4-1692 suggest, for securing safety of a battery when short is occurred inside or outside of a battery, that a battery separator is allowed to have shut down function which cut off current, by providing an obstruction material which can be heat-melted on a porous film made of a thermoplastic resin and by covering the surface of a micro porous film by heat-melting of this obstruction material. Further, JP-A Nos. 60-52 and 60-136161 suggest that a battery separator is allowed to have shut down function, by adhering a polyethylene-based resin powder onto polypropylene non-woven fabric and by heat-melting the resin to obstruct pores of the non-woven fabric. However, in these suggestions, thermoplastic resins are used, therefore, heat-resistance is not sufficient and short circuit temperature is low, and use is restricted in view of safety.

The present inventors have intensively investigated a separator which does not have problems as described above, and found that a separator containing ceramic powder in a heat-resistant nitrogen-containing aromatic polymer is highly heat-resistant and has high short circuit temperature, and further has excellent ion permeability.

SUMMARY OF THE INVENTION

An object of the present invention is to provide a non-aqueous electrolyte battery separator having excellent ion permeability and battery property while maintaining merits of a heat-resistant nitrogen-containing aromatic polymer that heat-resistance is high and short circuit temperature is high.

Another object of the present invention is to provide a non-aqueous electrolyte battery separator which has such safety that shut down occurs in over-heating, has so high short circuit temperature that it is not melted when heated, and further has excellent safety. Further object of the present invention is to provide a lithium secondary battery having high short-circuit temperature and excellent safety by using such as separator.

Namely, the present invention relates to (1) a non-aqueous electrolyte battery separator comprising a heat-resistant nitrogen-containing aromatic polymer and a ceramic powder.

Further, the present invention relates to (2) a non-aqueous electrolyte battery separator comprising a heat-resistant nitrogen-containing aromatic polymer, a ceramic powder, and a substrate made of woven fabric, non-woven fabric, paper or porous film.

Further, the present invention relates to (3) a non-aqueous electrolyte battery separator according to (1) or (2), wherein the non-aqueous electrolyte battery separator contains a thermoplastic polymer which is melted at a temperature of 260° C. or less in an amount of 10% by weight or more based on the whole separator, and said thermoplastic polymer is melted when temperature increases and obstructs pore of said separator.

Moreover, the present invention relates to (4) a non-aqueous electrolyte battery separator comprising a coated film obtained by a method comprising the following steps of:

(a) preparing a slurry solution which may contain a thermoplastic resin which is melted at a temperature of 260° C. or less, by dispersing a ceramic powder in a solution of a polar organic solvent containing a heat-resistant nitrogen-containing aromatic polymer in an amount of 1 to 1500 parts by weight based on 100 parts by weight of said heat-resistant nitrogen-containing aromatic polymer, (b) producing a coated film by coating said slurry solution, (c) depositing said heat-resistant nitrogen-containing aromatic polymer on said coated film, (d) removing the polar organic solvent from said coated film, and (e) drying said coated film.

Furthermore, the present invention relates to (5) a non-aqueous electrolyte battery separator comprising a coated film obtained by a method comprising the following steps of:

(a) preparing a slurry solution which may contain a thermoplastic resin which is melted at a temperature of 260° C. or less, by dispersing a ceramic powder in a solution of a polar organic solvent containing a heat-resistant nitrogen-containing aromatic polymer in an amount of 1 to 1500 parts by weight based on 100 parts by weight of said heat-resistant nitrogen-containing aromatic polymer, (b) producing a coated film by coating said slurry solution on a substrate made of woven fabric, non-woven fabric, paper or porous film, (c) depositing said heat-resistant nitrogen-containing aromatic polymer on said coated film, (d) removing the polar organic solvent from said coated film, and (e) drying said coated film.

Also, the present invention relates to (6) a lithium secondary battery comprising a non-aqueous electrolyte battery separator of any of the inventions (1) to (5).

DETAILED DESCRIPTION OF THE PREFERRED EMBODIMENTS

The non-aqueous electrolyte battery separator of the present invention comprises a heat-resistant nitrogen-containing aromatic polymer and a ceramic powder.

The heat-resistant nitrogen-containing aromatic polymer of the present invention is a polymer containing a nitrogen atom and an aromatic ring in the backbone, and examples thereof include an aromatic polyamide (hereinafter, may sometimes be referred to as "aramid"), aromatic polyimide (hereinafter, may sometimes be referred to as "polyimide"), aromatic polyamideimide and the like.

Examples of the aramid include a meta-oriented aromatic polyamide ((hereinafter, may sometimes be referred to as "meta-aramid") and para-oriented aromatic polyamide (hereinafter, may sometimes be referred to as "para-aramid"), and a para-aramid is preferable since it tends to become porous.

The para-amide is obtained by polycondensation of a para-oriented aromatic diamine with a para-oriented aromatic dicarboxylic halide, and substantially consists essentially of repeating units in which amide bonds are bonded in para-orientation or corresponding orientation (for example, orientation extending co-axially or in parallel to reverse direction such as 4,4'-biphenylene, 1,5-naphthalene, 2,6-naphthalene and the like).

Specifically, there are exemplified para-aramids having structure of para-orientation or orientation corresponding to para-orientation, such as poly(p-phenyleneterephthalamide), poly(p-benzamide), poly(4,4'-benzanilideterephthalamide), poly(p-phenylene-4,4'-biphenylenedicarboxylic amide), poly(p-phenylene-2,6-naphthalenedicarboxylic amide), poly(2-chloro-p-phenyleneterephthalamide), p-phenyleneterephthalamide/2,6-dichloro p-phenyleneterephthalamide copolymer and the like.

The para-aramid of the present invention can be dissolved in polar organic solvent to prepare a solution having low viscosity, and has an intrinsic viscosity preferably of 1.0 dl/g to 2.8 dl/g, further preferably of 1.7 dl/g to 2.5 dl/g for excellent coating property. A satisfactory film strength may not be obtained when the intrinsic viscosity is less than 1.0 dl/g. When the intrinsic viscosity is over than 2.8 dl/g, a stable para-amide solution may not be easily obtained, and it may be difficult to form a film because a para-amide is deposited.

The polar organic solvent herein used is for example a polar amide-based solvent or polar urea-based solvent, and specific examples thereof include N,N-dimethylformamide, N,N-dimethylacetoamide, N-methyl-2-pyrrolidone, tetramethylurea and the like, but are not limited to these examples.

The para-aramid of the present invention is preferably a porous polymer in the form of fibril. The fibril-like polymer is microscopically in the form of non-woven cloth and in the form of a porous layer containing pore and forms a so-called para-aramid porous resin.

The polyimide used in the present invention is not particularly restricted and preferably a whole aromatic polyimide produced by polycondensation of an aromatic diacid anhydride with a diamine. Specific examples of the diacid anhydride include pyromellitic dianhydride, 3,3'-4,4'-diphenylsulfonetetracarboxylic dianhydride, 3,3'-4,4'-benzophenonetetracarboxylic dianhydride, 2,2'-bis(3,4-dicarboxyphenyl)hexafluoropropane, 3,3'-4,4'-biphenyltetracarboxylic dianhydride and the like, but are not limited to these examples. Specific examples of the diamne include oxydianiline, p-phenylenediamine, benzophenonediamine, 3,3'-methylenedianiline, 3,3'-diaminobenzophenone, 3,3'-diaminodiphenylsulfone, 1,5'-naphthalenediamine and the like, but are not limited to these examples. In the present invention, when a porous film is made directly from a polyimide solution, a polyimide soluble in a solvent can be suitably used. As this polyimide, there is for example listed a polyimide, that is a polycondensate of 3,3'-4,4'-diphenylsulfonetetracarboxylic dianhydride with an aromatic diamine.

As the polar organic solvent used in the polyimide, dimethylsulfoxide, cresol, o-chlorophenol and the like can be suitably used in addition to those exemplified for the aramid.

In the present invention, a porous polyimide is preferable. Example, a solid film can be subjected to boring by mechanical process, laser process and the like to be made into porous material. When a polyimide film is made by a solution casting method, a porous film can be produced by controlling molding conditions of the polyimide such as polymer concentration in coating and the like. Further, a uniform and fine porous film can be produced using a solution having any polymer concentration by combining ceramic powders. Also, gas permeability can be controlled by added amount of a ceramic powder.

The non-aqueous electrolyte battery separator of the present invention is required to contain a ceramic powder. The ceramic powder is entangled and arrested by a heat-resistant nitrogen-containing aromatic polymer, and situated being totally or partially dispersed in the non-aqueous electrolyte battery separator.

The ceramic powder used in the present invention has an average particle size of the primary particle of preferably 1.0 $\mu$m or less, more preferably 0.5 $\mu$m or less in view of influence on strength of a non-aqueous electrolyte battery separator and smoothness on coated surface. The average particle size of the primary particle is measured by analyzing a photograph made by an electron microscope with a particle size measuring apparatus. When the average particle size of the primary particle of a ceramic powder is over 1.0 $\mu$m, the separator may become fragile and also coated surface may become fragile. The content of the ceramic powder is preferably from 1% by weight to 95% by weight, more preferably from 5% by weight to 50% by weight based on the weight of the non-aqueous electrolyte battery separator. When the content of the ceramic powder is less than 1% by weight based on the weight of the non-aqueous electrolyte battery separator, effect for promoting ion permeability and battery property may not be sufficient, and when over 95% by weight, the separator may become fragile and handling thereof may become difficult. The form of the ceramic powder is not particularly restricted, and sphere and random forms can also be used.

As the raw material of the ceramic powder in the present invention, metal oxide, metal nitride, metal carbide and the like having electrically insulating property are listed, and for example, alumina, silica, titanium dioxide, zirconium oxide and the like are preferably used.

As the substrate of the present invention, there are listed porous woven fabric, non-woven fabric, paper and porous films made of electrically insulating organic, inorganic fiber or pulp. Among them, non-woven fabric, paper or porous films are preferable in view of cost and small thickness.

The raw material of said substrate may be organic or inorganic, synthetic or natural material providing it has electrically insulating property, and materials containing organic fiber and/or inorganic fiber and/or organic fiber pulp and/or inorganic fiber pulp are listed. Specifically, natural fiber such as a fiber comprising a Manila hemp, thermoplastic polymer fiber and the like are listed as the organic fiber. As the fiber comprising a thermoplastic polymer, fibers such as polyolefins like polyethylene, polypropylene and the like, rayon, vinylon, polyester, acryl, polystyrene, nylon and the like are listed. As the inorganic fiber, glass fiber, alumina fiber and the like are listed.

The non-aqueous electrolyte battery separator (2) of the present invention comprises a heat-resistant nitrogen-containing aromatic polymer, a ceramic powder and a substrate made of woven fabric, non-woven fabric, paper or porous film.

The non-aqueous electrolyte battery separator (2) of the present invention is preferably one in which the substrate is coated with the above-described heat-resistant nitrogen-containing aromatic polymer containing a ceramic powder, or pore of the substrate is filled with the above-described heat-resistant nitrogen-containing aromatic polymer, or the substrate is coated with the above-described heat-resistant nitrogen-containing aromatic polymer and pore of the substrate is filled with the above-described heat-resistant nitrogen-containing aromatic polymer.

When used in the non-aqueous electrolyte battery separator (2) of the present invention, the weight per unit area of a substrate is preferably 40 g/m$^2$ or less, more preferably 15 g/m$^2$ or less. The pore percentage of the substrate is preferably 40% or more, further preferably 50% or more. The thickness of the substrate is preferably 70 $\mu$m or less, further preferably 25 $\mu$m or less.

The non-aqueous electrolyte battery separator (3) of the present invention contains a thermoplastic polymer which is melted at a temperature of 260° C. or less in an amount of 10% by weight or more, preferably 30% by weight or more, more preferably 40% by weight or more based on the whole separator, and the thermoplastic polymer is melted when temperature increases to obstruct pore of the separator. The above-described thermoplastic polymer may advantageously be a polymer which is melted in temperature increase, if it is used as a battery separator. The thermoplastic polymer is preferably a polymer which is melted at a temperature of 260° C. or less, more preferably 200° C. or less in view of shut down function, when it is used as a separator in a lithium secondary battery. The melting temperature is preferably about 100° C. or more because it is suitable for shut down.

As the thermoplastic polymer, polyolefin resins, acrylic resins, styrene resins, polyester resins, nylon resins and the like are listed. In particular, polyethylenes such as low density polyethylene, high density polyethylene, linear polyethylene and the like, or low molecular weight wax components thereof, or polyolefin resins such as polypropylene and the like are suitably used since they have an appropriate melting temperature and are available easily. These may be used alone or in a mixture thereof.

The thermoplastic polymer used in the present invention is preferably a powder having an average particle size of preferably 10 $\mu$m or less, more preferably 6 $\mu$m or less in view of dispersibility into a solvent and smoothness of the coated surface. The form of the powder particle is not particularly restricted, and any of spherical and random forms can be used.

In the non-aqueous electrolyte battery separator (3) of the present invention, a thermoplastic polymer is totally or partially dispersed in the form of a particle in a non-aqueous electrolyte battery separator, and the dispersion embodiment is not particularly restricted providing the thermoplastic polymer is melted when temperature increases to block pore of the separator.

The non-aqueous electrolyte battery separator (4) of the present invention comprises a coated film obtained by a method comprising the following steps (a) to (e) of:

(a) preparing a slurry solution which may contain a thermoplastic resin which is melted at a temperature of 260° C. or less, by dispersing a ceramic powder in a solution of a polar organic solvent containing a heat-resistant nitrogen-containing aromatic polymer in an amount of 1 to 1500 parts by weight based on 100 parts by weight of said heat-resistant nitrogen-containing aromatic polymer, (b) producing a coated film by coating said slurry solution, (c) depositing said heat-resistant nitrogen-containing aromatic polymer on said coated film, (d) removing the polar organic solvent from said coated film, and (e) drying said coated film.

The method for producing a non-aqueous electrolyte battery separator (4) of the present invention will be specifically described.

Step (a): Preparation of Slurry Solution

Cases using a para-aramid and a polyimide as a heat-resistant nitrogen-containing aromatic polymer will be excemplified.

When a para-aramid is used, for example, in a polar organic solvent containing 2 to 10% by weight of an alkaline metal chloride or alkaline earth metal chloride dissolved, a para-oriented aromatic dicarboxylic dihalide is added in an amount of 0.94 to 0.99 mol per 1.00 mol of a para-oriented aromatic diamine and is poly-condensed at a temperature of −20 to 50° C. to prepare a polar organic solvent solution of an aramid in which the concentration of the produced para-oriented aromatic polyamide is from 1 to 10% (by weight) and the intrinsic viscosity is from 1.0 to 2.8 dl/g.

As the para-oriented aromatic diamine used in polycondensation of a para-aramid, p-phenylenediamine, 4,4'-diaminobiphenyl, 2-methyl-p-phenylenediamine, 2-chloro-p-phenylenediamine, 2,6-dichloro-p-phenylenediamine, 2,6-naphthalenediamine, 1,5-naphthalenediamine, 4,4'-diaminobenzanilide, 3,4'-diaminodiphenyl ether and the like are listed. The para-oriented aromatic diamines can be used alone or in a mixture thereof and subjected to polycondensation.

As the para-oriented aromatic dicarboxylic dihalide used in polycondensation of a para-aramid, terephthalic dichloride, biphenyl-4,4'-diarboxylic dichloride, 2-chloroterephthalic dichloride, 2,5-dichloroterephthalic dichloride, 2-methylterephthalic dichloride, 2,6-naphthalenedicarboxylid dichloride, 1,5-naphthalenedicarboxylid dichloride, and the like are listed. The para-oriented aromatic dicarboxylic dihalide can be used alone or in a mixture thereof and subjected to polycondensation.

For the purposed of improving solubility of a para-aramid into a solvent, an alkaline metal chloride or alkaline earth metal chloride is preferably used. Specific examples include, lithium chloride and calcium chloride, but are not limited to these examples.

The added amount of the above-described chloride into the polymer system is preferably in the range from 0.5 to 6.0 mol, more preferably in the range from 1.0 to 4.0 mol based on 1.0 mol of an amide group produced in polycondensation. When the amount of the chloride is 0.5 mol or less, the solubility of a para-aramid produced may become insufficient, and when the amount is over 6.0 mol, it substantially may exceed the amount dissolved of the chloride into a solvent.

In general, when the amount of an alkaline metal chloride or alkaline earth metal chloride is less than 2% by weight, solubility of a para-aramid may be insufficient, and when over 10% by weight, an alkaline metal chloride or alkaline earth metal chloride may not be dissolved in a polar organic solvent such as a polar amide-based solvent, polar urea-based solvent or the like.

When the para-amide concentration is 0.5% by weight or less, productivity remarkably may decrease to cause industrial disadvantage. When the amount of a para-aramid is over 10% by weight, the para-aramid may be deposited and a stable para-aramid solution may not be easily obtained.

As the polar organic solvent solution of a polyimide, for example, N-methyl-2-pyrrolidone solution of a polyimide in which imidation has been completed is listed. N-methyl-2-pyrrolidone solution is prepared by polycondensation reaction of 3,3',4,4'-diphenylsulfonetetracarboxylic dianhydride with an aromatic diamine such as 4,4'-bis(p-aminophenoxy) diphenylsulfone and the like. When a polyimide is used as this polar organic solvent, cresol, o-chlorophenol and the like are listed in addition to the above-exemplified compounds.

A ceramic powder is dissolved in the above-described polar organic solvent solution in an amount of 1 to 1500 parts by weight, preferably 5 to 100 parts by weight per 100 parts by weight of a heat-resistant nitrogen-containing aromatic polymer. When the amount of the ceramic powder less than 1 parts by weight, improvement of in ion permeability and battery property is not sufficient. When the amount over 1500 parts by weight, the separator becomes fragile and handling thereof becomes difficult. optionally, a thermoplastic polymer may be added to the slurry solution.

Step (b): Production of a Coated Film

This slurry solution is coated on a base film, steel belt, roll, drum and the like to form a wet coated film.

As the base film, there are listed, for example, polyethylene terephthalate, paper subjected to releasing treatment, and the like. It is industrially often conducted to coat a solution on a steel belt having corrosion resistance which has been subjected to mirror finish. In small scale system, it can also be possible to coat a solution on a roll or a drum having corrosion resistance which has been subjected to mirror finish.

As the coating method, coating methods such as knife coating, blade coating, bar coating, gravure coating, die coating and the like are listed. In small scale system, bar coating, knife coating and the like are convenient. However, industrially, die coating is preferable in which a solution is not brought in contact with outer air.

Step (c): Deposition of Heat-resistant Nitrogen-containing Aromatic Polymer

The resulted coated film is placed in atmosphere controlled under constant humidity at a temperature of preferably 20° C. or more, and a heat-resistant nitrogen-containing aromatic polymer is allowed to deposit, then, immersed in a coagulation solution. Alternatively, it is immersed in a coagulation solution, deposition and coagulation of a polymer are conducted simultaneously to obtain a wet coated film. For uniform and quick coagulation, it is also possible that a poor solvent, for example, water or the like is previously added to a slurry solution, to prepare deposited condition.

In the case of a para-aramid, it is also possible that a part or all of a solvent is evaporated and simultaneously a polymer is deposited, namely, solvent removal process and deposition process are conducted simultaneously to obtain a semi-dried or dried coated film.

As the coagulation solution, an aqueous solution, alcoholic solution or the like may advantageously be used. Though the solution is not particularly limited, it is preferable to use an aqueous solution or alcoholic solution containing a polar organic solvent since solvent removal process can be industrially simplified.

Step (d): Removal of Polar Organic Solvent

Then, a polar organic solvent is removed from this coated film on which a heat-resistant nitrogen-containing aromatic polymer is deposited. For this removal, a part or all of the polar organic solvent may be evaporated, or it may be removed by using a solvent which can dissolve the polar organic solvent such as water, aqueous solution, alcoholic solution or the like. When the removal is conducted using water, it is preferable to use ion-exchanged water. Further it is also industrially preferable that washing is conducted in an aqueous solution containing the polar organic solvent in certain amount, then, washing with water is conducted. For drying, a solvent used for washing is evaporated by heating to be removed. When a thermoplastic polymer which is melted is contained, the drying temperature in this procedure is preferably not more than the temperature for the melting.

When, a para-aramid is prepared using an alkaline metal chloride or alkaline earth metal chloride, the alkaline metal chloride or alkaline earth metal chloride is washed and removed together with a solvent from a wet coated film on which the para-aramid has been deposited. Alternatively, the alkaline metal chloride or alkaline earth metal chloride is washed and removed from a dried coated film. For this removal, there is adopted a method in which a coated film is immersed in a solution and a solvent and a chloride are eluted. As the solution for eluting a solvent or a chloride, water, aqueous solution or alcoholic solution is preferable since it can dissolve both of the solvent and the chloride.

(e): Drying

The coated film from which a polar organic solvent has been removed can be preferably dried at the melting temperature or less of a polymer which is heat-melted to produce an intended dried coated film.

This dried coated film can be used as a non-aqueous electrolyte battery separator without any other treatment. For imparting shut down property, it is preferable to contain a thermoplastic polymer, this thermoplastic polymer may be added in any step. Also, it is preferable that a fine particle-like suspension of the thermoplastic polymer is coated on the dried coated film and dried to form a fine particle layer of the thermoplastic resin.

As the coating method, coating methods such as knife coating, blade coating, bar coating, gravure coating, die coating and the like are listed. In small scale system, bar coating, knife coating and the like are convenient.

The non-aqueous electrolyte battery separator (5) of the present invention comprises a coated film obtained by a method comprising the following steps (a) to (e) of:

(a) preparing a slurry solution which may contain a thermoplastic resin which is melted at a temperature of 260° C. or less, by dispersing a ceramic powder in a solution of a polar organic solvent containing a heat-resistant nitrogen-containing aromatic polymer in an amount of 1 to 1500 parts by weight based on 100 parts by weight of said heat-resistant nitrogen-containing aromatic polymer, (b) producing a coated film by coating said slurry solution on a substrate made of woven fabric, non-woven fabric, paper or porous film, (c) depositing said heat-resistant nitrogen-containing aromatic polymer on said coated film, (d) removing the polar organic solvent from said coated film, and (e) drying said coated film.

The method for producing a non-aqueous electrolyte battery separator (5) of the present invention will be specifically described.

The method for producing a non-aqueous electrolyte battery separator (5) of the present invention is in the same manner as for the separator (4) of the present invention except that a substrate made of woven fabric, non-woven fabric, paper or porous film is used.

The step (a) is the same as the step (a) for the separator (4) of the present invention.

The step (b) is the same as the step (b) for the separator (4) of the present invention except that coating is conducted on a substrate made of woven fabric, non-woven fabric, paper or porous film. Alternatively, it is also permissible that a slurry solution is coated on a roll or drum, then, the substrate is mounted to be impregnated with the solution.

The steps (c), (d) and (e). can be carried out in the same manners as in the steps (c), (d) and (e) for the separator (4) of the present invention.

This dried coated film can be used as a non-aqueous electrolyte battery separator without any other treatment.

For imparting or reinforcing shut down property, it is preferable to contain a thermoplastic polymer, this thermoplastic polymer may be added in any step. Also, it is preferable that a fine particle-like suspension of the thermoplastic polymer is coated on the dried coated film and dried to form a fine particle layer of the thermoplastic resin. The coating method is the same as that for the separator (4) of the present invention.

The thickness of the non-aqueous electrolyte battery separator of the present invention is preferably from 5 to 100 $\mu$m. When the thickness is less than 5 $\mu$m, strength as a non-aqueous electrolyte battery separator may lack and handling thereof may be difficult. As a non-aqueous electrolyte battery separator, higher thickness provides easier handling, however, a separator having so smaller thickness as not to cause short circuit is desirable for making internal resistance as low as possible in the case of a lithium secondary battery thought there is no strict restriction regarding thickness in the case of a nickel-cadmium battery. That is, in a lithium secondary battery separator, the thickness is preferably from 5 to 100 $\mu$m, further preferably from 5 to 50 $\mu$m, particularly preferably from 5 to 30 $\mu$m.

It is known that the heat-resistant nitrogen-containing aromatic polymer used in the present invention exhibits almost no degradation in strength at a temperature from room temperature to about 200° C., and has excellent heat resistance. Further, it has self-extinguishing property, is not decomposed and keeps its shape up to about 300° C., and heat-decomposed at a temperature over this range. Further, it is known that a ceramic powder exhibits almost no degradation in strength at a temperature up to about 1000° C., and has excellent heat resistance. Therefore, in a non-aqueous electrolyte battery using the separator of the present invention, even if the battery temperature increases due to short circuit inside or outside of the battery and the like, shut down function works, and even if the temperature further increases, it keeps the shape until high temperature, that is, it keeps insulation property between positive and negative electrodes and manifests excellent safety.

Pore size of the non-aqueous electrolyte battery separator of the present invention, or a diameter of the sphere (hereinafter, sometimes referred to as pore size) when the void can be approximated to sphere, is preferably about 1 $\mu$m or less. When the average size of the pore size is over 1 $\mu$m, there is possibility of occurrence of such problems that when a carbon powder which is a main component of positive and negative electrodes or a fragment thereof drops, short circuit and the like tends to occur.

The non-aqueous electrolyte battery separator of the present invention can be suitably used in a lithium secondary battery. In the non-aqueous electrolyte battery separator of the present invention, film form of the non-aqueous electrolyte battery separator is maintained even when temperature increases since it contains a heat-resistant nitrogen-containing aromatic polymer and a ceramic powder. Further, in the case of the non-aqueous electrolyte battery separator of the present invention containing a thermoplastic resin, when the battery is locally or totally heated, the thermoplastic polymer is melted, and introduced into fine pores of the separator to obstruct the fine pores, preventing current. Further, even when temperature increases, the polymer does not flow out since it is introduced in the fine pores. Thus, shut down of the battery is accomplished.

The non-aqueous electrolyte battery separator of the present invention manifests excellent ion permeability and battery property while keeping the feature of a heat-resistant nitrogen-containing aromatic polymer that heat-resistance is high and short circuit temperature is high. Further, the non-aqueous electrolyte battery separator of the present invention has safety property that shut down occurs in overheat, and further, is not melted when heated and has high short circuit temperature, providing more excellent safety. Moreover, the lithium battery of the present invention has higher short circuit temperature and more excellent safety by using the above-described separator.

EXAMPLE

The following examples further illustrate the present invention specifically, but do not limit the scope thereof. In the examples and comparative examples, test and evaluation methods or judging methods are as follows.
(1) Intrinsic Viscosity Intrinsic viscosity in the present invention is defined as a value measured by the following measuring method. A solution prepared by dissolving 0.5 g of a para-aramid polymer into 100 ml of 96 to 98% sulfuric acid, and 96 to 98% sulfuric acid were respectively subjected to measurement of flow time at 30° C. using a capillary viscometer, and the intrinsic viscosity was calculated according to the following formula using ratio of the measured flow times.

Intrinsic viscosity=$\ln(T/T_0)/C$ [unit: dl/g]

T and $T_0$ represent flow times of a para-aramid sulfuric acid solution and sulfuric acid, respectively, and C represents the para-aramid concentration (dl/g) in the para-aramid sulfuric acid solution.
(2) Measurement of Thickness of a Coated Film and the Like The thickness of the obtained coated film and the like were measured according to JIS K7130-1992.
(3) Pore Ratio Coated films and the like were cut into squares having an edge length of 10 cm, and weights (wg) and thickness (D cm) were measured. The weights of materials in the sample were calculated, weight of each material (Wi) was divided by true specific gravity, volume of each material was hypothesized, and void ratio (% by volume) was calculated.

Pore ratio (%)=100−{(W1/true specific gravity 1)+(W2/true specific gravity 2)+ . . . +(Wn/true specific gravity n)}/(100D)

$$W = \sum_{i=1}^{n} Wi$$

Regarding an aerial weight of coated films and the like, coated films and the like were cut into squares having an edge length of 10 cm, and weights were measured according to the following formula.

Aerial weight (g/m$^2$)=weight of sample (g)/0.01 (m$^2$)

Aerial weight of each material was calculated from amount used for film forming, and ratio.
(4) Gas Permeability The flow amount of air through a sample having a measuring area of 11.3 cm$^2$ (diameter: 38 mm) at a pressure of 3 kg/cm$^2$ was measured as air permeability by using Perm Porometer manufactured by Porous Materials Inc., U.S. according to ASTM F316-86.

In general, it is judged that when air permeability is higher, ion permeability is more excellent and battery property is also more excellent in the same material system.
(5) Tensile Strength A specimen was cut out from the resulted coating films and the like by using a dumbbell cutter manufactured by Dumbbell Corp., and tensile strength, elastic modulus and strain at break were measured according to JIS K-7127 using Instron Universal Tester model4301 manufactured by Instron Japan Corp.
(6) Measurement of Tearing Strength A specimen was cut out from the resulted coating films and the like by using a dumbbell cutter for JIS K-7128-1991 C method (right angle tearing method) manufactured by Dumbbell Corp. , and tearing strength was measured according to JIS K-7128-1991 C method (right angle tearing method using Instron Universal Tensile Tester model 4301 manufactured by Instron Japan Corp. Both ends of the sample were clamped with chucks of the universal tensile tester, drawn at a speed of 200 mm/minute, and load and change during the tension were recorded by a recorder. Tearing strength was calculated from load when tearing of the sample started. Then, tearing transmission resistance was calculated from average value of loads until the sample was completely broken.

The tearing strength and tearing transmission resistance were calculated according to the following formulae.

Tearing strength (kg/mm)=maximum load when tearing of sample start/sample thickness Tearing transmission strength (kg/mm)=average value of loads after initiation of tearing of sample until complete break/sample thickness (7) Measurement of Internal Electric Resistance in Flat Battery (Intended for Measuring Electric Resistance, Evaluating Shut Down Action and Evaluating Heat-resistance of Separator)

Coated films and the like were cut into squares having an edge length of 25 mm, and impregnated with an electrolyte solution of a 1N propylene carbonate solution of LiPF$_6$. This was sandwiched between two platinum disk electrodes having a thickness of 0.5 mm and a diameter of 18 mm, 1 volt was applied at 1 KHz between these electrodes to measure internal electric resistance of the flat battery, and the internal electric resistance at a temperature of 25° C. was used as an electric resistance of the separator. This flat battery was placed on a heat plate, and heated at a rate of 4° C./minute from 25° C. to 200° C. The temperature at which internal electric resistance increases in this process was recognized as shut down working temperature.
(8) Evaluation as Non-aqueous Electrolyte Battery Separator For preparing an anode, a lithium nickelate powder, a carbonaceous conductive powder and polyvinylidene fluoride were mixed at a ratio by weight of 87:10:3 using a N-methylpyrrolidone solvent to prepare a paste, this paste was coated on a 20 μm aluminum foil, dried and pressed to form a sheet having a thickness of 85 μm. For preparing a cathode, a graphite powder and polyvinylidene fluoride were mixed at a ratio by weight of 90:10 using a N-methylpyrrolidone solvent to prepare a paste, this paste was coated on a 10 μm copper foil, dried and pressed to form a sheet having a thickness of 100 μm. Lithium phosphate hexa-fluoride was dissolved (1 mol/L concentration) in a mixed solvent of ethylene carbonate, dimethyl carbonate and ethylmethyl carbonate (ratio weight; 30:35:35) to obtain a solution used as an electrolyte solution. The non-aqueous electrolyte battery separator described in the examples of the present invention was us ed as a separator.

The battery used had flat structure having an anode area of 2.34 cm$^2$ . The cathode sheet, separator, anode sheet as prepared above were laminated in this order in a box under argon atmosphere, then, the separator is fully impregnated with the electrolyte solution. The flat battery produced was subjected to 8 cycles of a charge voltage of 4.2 V and a discharge voltage of 2.75 V, and discharge capacity (discharge current: 1.5 mA) was measured at 8 cycle, defined as discharge capacity at 0.2 C. Also, cycle degratation was measured. Charging was conducted under the above-described conditions and discharge capacity (discharge current: 22.5 mA) was measured to be defined as discharge capacity at 3 C. Load property of the battery at 3 C was calculated according to the following formula.

Load property (%) of battery at 3 C=discharge capacity at 3 C/discharge capacity at 0.2×100

"C." is defined as discharge is occurred for one hour, also "3C" is defined as discharge is occurred for 20 minutes.
(9) Safety Test in Cylindrical Battery Anode sheet electrodes and cathode sheet electrodes produced in the same manner as in the procedure (8) were laminated via the above-described separator in the order of cathode, separator, anode and separator, and the resulted laminate was wound from one end to obtain an electrode element having roll form.

The above-described electrode element was inserted into a battery can, impregnated with the above-described non-aqueous electrolyte solution, and a battery lid also acting as an anode terminal having safety was fastened via a gasket to obtain a cylindrical battery having 18650 size.
(10) Method for Measuring Average Particle Size of Ceramic Powder The average particle size was obtained by analyzing a photography obtained by an electron microscope using a particle size measuring apparatus TGZ 3 manufactured by Karl Zeiss Corp.

Example 1

1. Production of poly(p-phenyleneterephthalamide)

Poly(p-phenyleneterephthalamide) (hereinafter, sometimes referred to as PPTA) was produced using a 3 liter separable flask equipped with a stirrer, thermometer, nitrogen introducing tube and powder addition port. The flask was fully dried, charged with 2200 g of N-methyl-2-pyrrolidone, and 151.07 g of a calcium chloride powder which had been dried in vacuo at 200° C. for 2 hours was added, the resulted mixture was heated to 100° C. for completion dissolution. The temperature was lowered to room temperature again, and 68.23 g of p-phenylenediamine was added and dissolved completely. Then, 124.97 g of terephthalic dichloride was added in ten portions at an interval of about 5 minutes while maintaining this solution at 20° C.±2° C. One portion of ten-divided terephthalic dichloride was dissolved in the same weight of N-methyl-2-pyrrolidone (hereinafter, sometimes referred to as NMP) as that of the terephthalic dichloride before the final addition. The solution was filtered through a 1500 mesh stainless wire gauze. The resulted solution was liquid crystal phase having a PPTA concentration of 6%, and exhibited optical anisotropy. A part of the PPTA solution was sampled, and precipitated again in water to obtain PPTA having an intrinsic viscosity of 2.01 dl/g.

2. Preparation of PPTA Slurry Solution for Coating 65 g of the PPTA solution in the above-described process 1. in Example 1 was weighed into a 500 ml separable flask equipped with a stirrer, thermometer, nitrogen introducing tube and liquid addition port, to this was added 235 g of NMP, and the mixture was processed finally into an isotropic solution having a PPTA concentration of 1.3% by weight and stirred for 60 minutes.

Into the above-described solution was mixed 3.9 g of an alumina fine particle (manufactured by Nippon Aerosil Corp.; Alumina C, average particle size 0.013 $\mu$m), and the mixture was stirred for 240 minutes. The slurry solution in which the alumina fine particle had been sufficiently dispersed was filtered through a 1000 mesh wire gauze, then, defoamed under reduced pressure to obtain a slurry solution for coating.

3. Production of Coating Film

A polyethylenetelephthalate (hereinafter, sometimes referred to as PET) film having a thickness of 100 $\mu$m was wound on a drum having a diameter of 550 mm and a length of 350 mm. Onto the PET film, a substrate (polyester paper, trade name 0132TH-8 narrow denier type, aerial weight 8 g/m$^2$, thickness 20 $\mu$m; manufactured by Japan Vilene Co., Ltd.) was wound. One end of the substrate was fixed on the drum with a tape. On another end, a weight of 0.6 g was suspended so that the load was applied uniformly to the substrate. A stainless coating bar having a diameter of 20 mm was mounted on the top of the drum in parallel so that clearance between it and the drum was 0.3 mm. Drum was so rotated that the end fixed with tape was situated between the drum and the coating bar, and stopped. The drum was rotated at 0.5 rpm while supplying the PPTA slurry solution for coating as prepared above to the substrate in front of the coating bar, to conduct coating on the substrate.

When the whole substrate was coated, the rotation of the drum was stopped, and left under atmosphere of a temperature of 23° C. and a humidity of 50% for 10 minutes to allow PPTA to deposit. The 100 $\mu$m PET film and the coated film prepared by coating the slurry solution on the substrate and allowing it to deposit were removed in integrated form from the drum and immersed in ion-exchanged water, and washed for 12 hours while ion-exchanged water was being flown. After the washing, the PET film was taken up, and the wet coated film was sandwiched with polyester clothes from both sides, further sandwiched by aramid felts, plated on an aluminum flat plate having a thickness of 3 mm, and onto this was placed a nylon film having a thickness of 0.1 mm, and the surrounding area was sealed with a sealing material, and dried at 150° C. for 2 hours with evacuating inside thereof, to obtain a dried coated film.

4. Coating of Polyolefin Suspension

Suspensions of polyolefin (hereinafter, referred to as "PO")(Chemipearl WF 640 and Chemipearl WP 100 (manufactured by Mitsui Petrochemical Industries, Ltd.)) were mixed in the same amount, and to this was added ion-exchanged water so that the solid contend was 30% to prepare a polyolefin suspension for coating.

Chemipearl WF 640 and Chemipearl WP 100:Lower molecular weight polyolefin having a particle size of 1 $\mu$m (measured by Colter.Counter method).

A PET film having a thickness of 25 $\mu$m which had been subjected to releasing treatment was wound on a drum having a diameter of 550 mm and a length of 350 mm. Onto the PET film, the above-described dried coated film cut into a width of 300 mm and a length of 900 mm was wound, and one end was fixed on the drum with a tape. On another end, a weight of 0.6 g was suspended so that the load was applied uniformly to the dried coated film. A stainless coating bar having a diameter of 20 mm was mounted on the top of the drum in parallel so that clearance between it and the drum was 0.075 mm. Drum was so rotated that the end fixed with tape was situated between the drum and the coating bar, and stopped. The drum was rotated at 0.5 rpm while supplying the polyolefin suspension for coating as prepared above onto the dried coated film in front of the coating bar, to conduct coating of the polyolefin suspension onto the dried coated film. When the whole dried coated film was coated, the rotation of drum was stopped, left and dried for 60 minutes to obtain a non-aqueous electrolyte separator.

5. Physical Properties of Non-aqueous Electrolyte Battery Separator

The above-described non-aqueous electrolyte separator had a thickness of 26.3 $\mu$m, an aerial weight of 19.2 g/m$^2$ (PET paper; 8 g/m$^2$, PPTA; 3.1 g/m$^2$, alumina; 3.1 g/m$^2$, PO; 5.0 g/m$^2$), and a void ratio of 44.8%. The separator was observed with a scanning electron microscope to find that one surface was a porous layer which was made of a PPTA resin in the form of fibril, layer having a thickness of about 0.1 $\mu$m or less, in which an alumina fine particle having a particle size of about 0.013 $\mu$m was dispersed between the fibrils and which had voids having a pore size of 0.05 to 0.2 $\mu$m. Another surface carried polyolefin particles having a particle size of about 1 $\mu$m in the form of a layer having a thickness of about 5 $\mu$m. The section was observed to find that an alumina fine particle having a particle size of about 0.013 $\mu$m was filled between the polyester fiber of the substrate paper so that the alumina fine particle was dispersed between the PPTA resin in the form of fibril having a thickness of about 0.1 $\mu$m or less.

The separator of the present invention had an air permeability of 105 cc/sec, a tensile strength of 4.9 kg/mm$^2$, a strain at break of 2.8%, a tearing strength of 4.9 kg/mm and a tearing transmission resistance of 2.5 kg/mm.

6. Measurement of Shut Down Ability and Evaluation of Heat-resistance

The internal electrical resistance at 25° C. before heating of the above-described separator was 25$\Omega$. When the temperature of the sample increased gradually, the internal electric resistance decreased gradually, however, from around 100° C. on, the internal electric resistance started to increase and reached to 100$\Omega$ at about 120° C. The temperature was further increased to 200° C. to find no reduction in electric resistance by melt down. Form the above-described results, it was found that the separator of the present invention had shut down function which cut off current in temperature increase, and heat-resistance.

7. Evaluation as Non-aqueous Electrolyte Battery Separator

The resulted separator had a discharge capacity at 8$^{th}$ cycle of 188 mAH/g (discharge current 1.5 mA), and operated normally without cycle degradation. Load property was 41% at 3 C. From the above-described results, it was found that the separator of the present invention had function as a non-aqueous electrolyte battery separator.

8. Safety Test on Cylindrical Battery

Two cylindrical batteries obtained in the above-described method were made into overcharged condition by conducting 150% charging base on rated capacity, then needle piercing test was conducted. The needle piercing test was conducted according to lithium secondary battery safety evaluation standard guideline of Nippon Chikudenchi Battery Association(Nippon Chikudenchi Kogyokai Guideline SBA-G1101-1995).

In spite of such severe condition as overcharge, the battery subjected to the test did not manifest neither breakage nor ignition.

Example 2

1. Preparation of PPTA Slurry Solution for Coating

It was prepared in the same manner as in Example 1 except that the weight of the alumina fine particle mixed was 39 g.

2. Production of Coated Film

It was made in the same manner as process 3 in Example 1 except that the stainless coating bar was placed in parallel so that the clearance between it and the drum was 0.1 mm.

3. Coating of Polyolefin Suspension Layer

A non-aqueous electrolyte battery separator was obtained in the same manner as process 4 in Example 1. (0081)

4. Physical Properties of Non-aqueous Electrolyte Battery Separator

The above-described non-aqueous electrolyte separator had a thickness of 24.1 $\mu$m, an aerial weight of 17.8 g/m$^2$ (PET paper; 8 g/m$^2$, PPTA; 0.42 g/m$^2$, alumina; 4.2 g/m$^2$, PO; 5.0 g/m$^2$), and a void ratio of 45.3%. The separator was observed with a scanning electron microscope to find that one surface was a porous layer which was made of a PPTA resin in the form of fibril, said layer having a thickness of about 0.1 $\mu$m or less, in which an alumina fine particle having a particle size of about 0.013 $\mu$m was dispersed between the fibrils and which had voids having a pore size of 0.05 to 0.2 $\mu$m. Another surface carried polyolefin particles having a particle size of about 1 $\mu$m in the form of a layer having a thickness of about 5 $\mu$m. The section was observed to find that an alumina fine particle having a particle size of about 0.013 $\mu$m was filled between the polyester fiber of the substrate paper so that the alumina fine particle was dispersed between the PPTA resin in the form of fibril having a thickness of about 0.1 $\mu$m or less.

The separator of the present invention had an air permeability of 750 cc/sec.

5. Measurement of Shut Down Ability and Evaluation of Heat-resistance

The internal electrical resistance at 25° C. before heating of the above-described separator was 20$\Omega$. When the temperature of the sample increased gradually, the internal electric resistance decreased gradually, however, from around 100° C., the internal electric resistance started to increase and reached to 252$\Omega$ at about 120° C. The temperature was further increased to 200° C. to find no reduction in electric resistance by melt down. Form the above-described results, it was found that the separator of the present invention had shut down function which cut off current in temperature increase, and heat-resistance.

6. Evaluation as Non-aqueous Electrolyte Battery Separator

The resulted separator had a discharge capacity at 8 cycle of 193 mAH/g (discharge current 1.5 mA), and operated normally without cycle degradation. Load property was 47% at 3 C. From the above-described results, it was found that the separator of the present invention had function as a non-aqueous electrolyte battery separator.

Example 3

1. Preparation of Polyimide Resin Slurry Solution for Coating 100 g of a NMP solution of a polyimide resin soluble in a solvent having a polymer concentration of 20% (Ricacoat PN-20; manufactured by New Japan Chemical Co., Ltd.) and 2 g of an alumina fine particle (manufactured by Nippon Aerosil Corp.; Alumina C, average particle size 0.013 $\mu$m) were weighed into a 500 ml separable flask equipped with a stirrer, thermometer, nitrogen introducing tube and liquid addition port, and the mixture was stirred for 120 minutes. To this was added 45 ml of NMP, and the mixture was stirred for 120 minutes. The slurry solution in which the alumina fine particle had been sufficiently dispersed was filtered through a 1000 mesh wire gauze, then, defoamed under reduced pressure to obtain a slurry solution for coating.

2. Production of Coating Film

It was prepared in the same manner as process 3 in Example 1 except that the stainless coating bar was placed in parallel so that the clearance between it and the drum was 0.1 mm.

3. Coating of Polyolefin Suspension

A non-aqueous electrolyte battery separator was obtained in the same manner as in Example 1.

4. Physical Properties of Non-aqueous Electrolyte Battery Separator

The above-described non-aqueous electrolyte separator had a thickness of 27.4 μm, an aerial weight of 18.1 g/m$^2$ (PET paper; 8 g/m$^2$, polyimide; 4.4 g/m$^2$, alumina; 0.44 g/m$^2$, PO; 5.3 g/m$^2$), and a void ratio of 45.4%. The section of the separator was observed with a scanning electron microscope to find one layer in which an alumina fine particle having a particle size of about 0.013 μm was filled between the polyester fiber of the substrate paper so that the alumina fine particle was dispersed to form open cell in the porous polyimide resin and a layer containing polyolefin particles having a particle size of about 1 μm, and having a thickness of about 5 μm.

5. Measurement of Shut Down Ability and Evaluation of Heat-resistance

The internal electrical resistance at 25° C. before heating of the above-described separator was 35Ω. When the temperature of the sample increased gradually, the internal electric resistance decreased gradually, however, from around 100° C., the internal electric resistance started to increase and reached to 70Ω at about 120° C. The temperature was further increased to 200° C. to find no reduction in electric resistance by melt down. Form the above-described results, it was found that the separator of the present invention had shut down function which cut off current in temperature increase, and heat-resistance.

6. Evaluation as Non-aqueous Electrolyte Battery Separator

The resulted separator had a discharge capacity at 8 cycle of 183 mAH/g (discharge current 1.5 mA), and operated normally without cycle degradation. Load property was 8% at 3 C. From the above-described results, it was found that the separator of the present invention had function as a non-aqueous electrolyte battery separator.

Example 4

1. Preparation of Polyimide Resin Slurry Solution for Coating 100 g of a NMP solution of a polyimide resin soluble in a solvent having a polymer concentration of 20% (Ricacoat PN-20; manufactured by New Japan Chemical Co., Ltd.) and 7 g of an alumina fine particle (manufactured by Nippon Aerosil Corp.; Alumina C, average particle size 0.013 μm) were weighed into a 500 ml separable flask equipped with a stirrer, thermometer, nitrogen introducing tube and liquid addition port, and the mixture was stirred for 120 minutes. To this was added 28 ml of NMP, and the mixture was stirred for 120 minutes. The slurry solution in which the alumina fine particle had been sufficiently dispersed was filtered through a 1000 mesh wire gauze, then, defoamed under reduced pressure to obtain a slurry solution for coating.

2. Production of Coating Film

It was prepared in the same manner as process 3 in Example 1 except that the stainless coating bar was placed in parallel so that the clearance between it and the drum was 0.1 mm.

3. Coating of Polyolefin Suspension

A non-aqueous electrolyte battery separator was obtained in the same manner as process 4 in Example 1.

4. Physical Properties of Non-aqueous Electrolyte Battery Separator

The above-described non-aqueous electrolyte separator had a thickness of 26.7 μm, an aerial weight of 17.7 g/m$^2$ (PET paper; 8 g/m$^2$, polyimide; 3.4 g/m$^2$, alumina; 1.2 g/m$^2$, PO; 5.1 g/m$^2$), and a void ratio of 46.5%. The section of the separator was observed with a scanning electron microscope to find one layer in which an alumina fine particle having a particle size of about 0.013 μm was filled between the polyester fiber of the substrate paper so that the alumina fine particle was dispersed to form open cell in the porous polyimide resin and a layer containing polyolefin particles having a particle size of about 1 μm, and having a thickness of about 5 μm.

The separator of the present invention had an air permeability of 680 cc/sec.

5. Measurement of Shut Down Ability

The internal electrical resistance at 25° C. before heating of the above-described separator was 25Ω. When the temperature of the sample increased gradually, the internal electric resistance decreased gradually, however, from around 100° C., the internal electric resistance started to increase and reached to 79Ω at about 120° C. The temperature was further increased to 200° C. to find no reduction in electric resistance by melt down. Form the above-described results, it was found that the separator of the present invention had shut down function which cut off current in temperature increase, and heat-resistance.

6. Evaluation as Non-aqueous Electrolyte Battery Separator

The resulted separator had a discharge capacity at 8 cycle of 190 mAH/g (discharge current 1.5 mA), and operated normally without cycle degradation. Load property was 24% at 3 C. From the above-described results, it was found that the separator of the present invention had function as a non-aqueous electrolyte battery separator.

Example 5

1. Preparation of Polyimide Resin Slurry Solution for Coating 100 g of a NMP solution of a polyimide resin soluble in a solvent having a polymer concentration of 20% (Ricacoat PN-20; manufactured by New Japan Chemical Co., Ltd.) and 10 g of an alumina fine particle (manufactured by Nippon Aerosil Corp.; Alumina C, average particle size 0.013 μm) were weighed into a 500 ml separable flask equipped with a stirrer, thermometer, nitrogen introducing tube and liquid addition port, and the mixture was stirred for 120 minutes. To this was added 40 ml of NMP, and the mixture was stirred for 120 minutes. The slurry solution in which the alumina fine particle had been sufficiently dispersed was filtered through a 1000 mesh wire gauze, then, defoamed under reduced pressure to obtain a slurry solution for coating.

2. Production of Coating Film

It was prepared in the same manner as process 3 in Example 1 except that the stainless coating bar was placed in parallel so that the clearance between it and the drum was 0.1 mm.

3. Coating of Polyolefin Suspension

A non-aqueous electrolyte battery separator was obtained in the same manner as process 4 in Example 1 except that the stainless coating bar was placed in parallel so that the clearance between it and the drum was 0.05 mm. (0097)

4. Physical Properties of Non-aqueous Electrolyte Battery Separator

The above-described non-aqueous electrolyte separator had a thickness of 29.6 μm, an aerial weight of 20.5 g/m$^2$ (PET paper; 8 g/m$^2$, polyimide; 4.9 g/m$^2$, alumina; 2.5 g/m$^2$, PO; 5.1 g/m$^2$), and a void ratio of 48.1%. The section of the separator was observed with a scanning electron microscope to find one layer in which an alumina fine particle having a particle size of about 0.013 μm was filled between the polyester fiber of the substrate paper so that the alumina fine particle was dispersed to form open cell in the porous polyimide resin and a layer containing polyolefin particles having a particle size of about 1 μm, and having a thickness of about 5 μm.

The separator of the present invention had an air permeability of 3200 cc/sec, a tensile strength of 4.5 kg/mm², a strain at break of 14.0%, a tearing strength of 7.5 kg/mm and a tearing transmission resistance of 3.3 kg/mm.

5. Measurement of Shut Down Ability and Evaluation of Heat-resistance

The internal electrical resistance at 25° C. before heating of the above-described separator was 35Ω. When the temperature of the sample increased gradually, the internal electric resistance decreased gradually, however, from around 100° C., the internal electric resistance started to increase and reached to 221Ω at about 120° C. The temperature was further increased to 200° C. to find no reduction in electric resistance by melt down. Form the above-described results, it was found that the separator of the present invention had shut down function which cut off current in temperature increase, and heat-resistance.

6. Evaluation as Non-aqueous Electrolyte Battery Separator

The resulted separator had a discharge capacity at 8 cycle of 187 mAH/g (discharge current 1.5 mA), and operated normally without cycle degradation. Load property was 63% at 3 C. From the above-described results, it was found that the separator of the present invention had function as a non-aqueous electrolyte battery separator.

7. Safety Test on Cylindrical Battery

Two cylindrical batteries obtained in the above-described method were made into overcharged condition by conducting 150% charging base on rated capacity, then needle piercing test was conducted. The needle piercing test was conducted according to lithium secondary battery safety evaluation standard guideline of Nippon Chikudenchi Battery Association (Nippon Chikudenchi Kogyokai Guideline SBA-G1101-1995)

In spite of such severe condition as overcharge, the battery subjected to the test did not manifest neither breakage nor ignition.

Example 6

1. Preparation of Polyimide Resin Slurry Solution for Coating 100 g of a NMP solution of a polyimide resin soluble in a solvent having a polymer concentration of 20% (Ricacoat PN-20; manufactured by New Japan Chemical Co., Ltd.) and 10 g of an alumina fine particle (AMS-12;manufactured by Sumitomo Chemical Co., Ltd.) having a particle size of 0.4 μm were weighed into a 500 ml separable flask equipped with a stirrer, thermometer, nitrogen introducing tube and liquid addition port, and the mixture was stirred for 120 minutes. To this was added 45 ml of NMP, and the mixture was stirred for 120 minutes, then, defoamed under reduced pressure to obtain a slurry solution for coating. This slurry solution was allowed to stand still for 24 hours to find deposition of the alumina fine particle.

2. Production of Coating Film

It was prepared in the same manner as process 3 in Example 1 except that the stainless coating bar was placed in parallel so that the clearance between it and the drum was 0.1 mm.

3. Coating of Polyolefin Suspension

A non-aqueous electrolyte battery separator was obtained in the same manner as process 4 in Example 1.

4. Physical Properties of Non-aqueous Electrolyte Battery Separator

The above-described non-aqueous electrolyte separator had a thickness of 26.5 μm, an aerial weight of 17.8 g/m² (PET paper; 8 g/m², polyimide; 3.0 g/m², alumina; 1.5 g/m², PO; 5.3 g/m²), and a void ratio of 46.0%. The section of the separator was observed with a scanning electron microscope to find one layer in which an alumina fine particle having a particle size of about 0.4 μm was filled between the polyester fiber of the substrate paper so that the alumina fine particle was dispersed to form open cell in the porous polyimide resin and a layer containing polyolefin particles having a particle size of about 1 μm, and having a thickness of about 5 μm.

The separator had air permeabilities from 120 cc/sec to 270 cc/sec, and unevenness depending on site was observed.

Comparative Example 1

1. Preparation of Polyimide Resin Slurry Solution for Coating 1100 g of a NMP solution of a polyimide resin soluble in a solvent having a polymer concentration of 20% (Ricacoat PN-20; manufactured by New Japan Chemical Co., Ltd.) was weighed into a 500 ml separable flask equipped with a stirrer, thermometer, nitrogen introducing tube and liquid addition port, and the mixture was defoamed under reduced pressure to obtain a solution for coating.

2. Production of Coating Film

It was prepared in the same manner as process 3 in Example 1 except that the stainless coating bar was placed in parallel so that the clearance between it and the drum was 0.05 mm.

3. Coating of Polyolefin Suspension

A non-aqueous electrolyte battery separator was obtained in the same manner as process 4 in Example 1.

4. Physical Properties of Non-aqueous Electrolyte Battery Separator

The above-described non-aqueous electrolyte separator had a thickness of 28.0 μm, an aerial weight of 17.7 g/m² (PET paper; 8 g m², polyimide; 4.6 g/m², PO; 5.1 g/m²) and a pore ratio of 47.3%. The section of the separator was observed with a scanning electron microscope to find one layer in which a porous polyimide resin was filled between the polyester fiber of the substrate paper and a layer containing polyolefin particles having a particle size of about 1 μm, and having a thickness of about 5 μm.

The separator had an air permeabilities of as low as 3 cc/sec.

5. Measurement of Shut Down Ability and Evaluation as Battery Separator

It is impossible to measure because of poor impregnation of electrolyte.

Example 7

1. Preparation of PPTA Dope for Coating PPTA Dope for Coating ①

100 g of the PPTA dope in the above-described process 1. in Example 1 was weighed into a 500 ml separable flask equipped with a stirrer, thermometer, nitrogen introducing tube and liquid addition port, to this was added 140 g of NMP, and the mixture was processed finally into an isotropic solution having a PPTA concentration of 2.5% by weight and stirred for 60 minutes. Into the above-described solution having a PPTA concentration of 2.5% by weight was mixed 6 g of an alumina fine particle (manufactured by Nippon Aerosil Corp.; Alumina C), and the mixture was stirred for 240 minutes. The coating dope was passed through a nanomizer three times to fully disperse the alumina fine particle and was filtered through a 1000 mesh wire gauze. Then, defoamed under reduced pressure to obtain a dope for coating.

2. Production of Porous Film Layer

A PET film having a thickness of 100 μm was wound on a drum having a diameter of 550 mm and a length of 350 mm. Onto the PET film, a substrate (polyethylene separator, aerial weight 10.5 g/m$^2$, thickness 16 µm; pore ratio 40%) was wound. One end of the substrate was fixed on the drum with a tape. On another end, a weight of 0.6 g was suspended so that the load was applied uniformly to the substrate. A stainless coating bar having a diameter of 25 mm was mounted on the top of the drum in parallel so that clearance between it and the drum was 0.15 mm. Drum was so rotated that the end fixed with tape was situated between the drum and the coating bar, and stopped. The drum was rotated at 0.5 rpm while supplying the PPTA slurry solution for coating as prepared above to the substrate in front of the coating bar, to conduct coating on the substrate.

The whole substrate was coated, the drum was left under atmosphere of a temperature of 23° C. and a humidity of 50% for 10 minutes while the drum was being rotated to allow PPTA to deposit. The 100 µm PET film and the film prepared by coating and depositing the dope on the substrate were removed in integrated form from the drum and immersed in ion-exchanged water, and washed for 12 hours while ion-exchanged water was being flown. After the washing, the PET film was taken up, and the wet coated film was sandwiched with polyester clothes from both sides, further sandwiched by aramid felts, plated on an aluminum flat plate having a thickness of 3 mm, and onto this was placed a nylon film having a thickness of 0.1 mm, and the surrounding area was sealed with a sealing material, and dried at 70° C. for 6 hours with evacuating inside thereof, to obtain a non-aqueous electrolyte battery separator.

3. Physical Properties of Non-aqueous Electrolyte Battery Separator

The above-described non-aqueous electrolyte separator had a thickness of 24.0 µm, an aerial weight of 17.0 g/m$^2$ (polyethylene separator 10.5 g/m$^2$, PPTA; 3.2 g/m$^2$, alumina; 3.2 g/m$^2$), and a void ratio of the heat-resistant layer of 59.4%. The film was observed with a scanning electron microscope to find that one surface was a porous layer which was made of a PPTA resin in the form of fibril, layer having a thickness of about 0.1 µm or less, in which an alumina fine particle having a particle size of about 0.013 µm was dispersed between the fibrils and which had voids having a pore size of 0.05 to 0.2 µm. The section was observed to find two-layer structure in which the PPTA resin invaded into and adhered to the substrate polyethylene separator.

The separator of the present invention had an air permeability of 43 cc/sec.

4. Measurement of Shut Down Ability

The internal electrical resistance at 25° C. before heating of the above-described separator was 20Ω. When the temperature of the sample increased gradually, the internal electric resistance decreased gradually, however, from around 130° C., the internal electric resistance started to increase and reached to 2KΩ at about 135° C. The temperature was further increased to 200° C. to find no reduction in electric resistance by melt down. Form the above-described results, it was found that the separator of the present invention had shut down function which cut off current in temperature increase, and heat-resistance.

5. Evaluation as Non-aqueous Electrolyte Battery Separator

The resulted separator had a discharge capacity at 8$^{th}$ cycle of 193 mAH/g (discharge current 1.5 mA), and operated normally without cycle degradation. Load property was 53% at 3 C. From the above-described results, it was found that the separator of the present invention had function as a non-aqueous electrolyte battery separator.

Example 8

1. Preparation of Polyimide Resin Dope for Coating 100 g of a NMP solution of a polyimide resin having a polymer concentration of 20% (PN-20; manufactured by New Japan Chemical Co., Ltd.) and 10 g of an alumina fine particle (manufactured by Nippon Aerosil Corp.; Alumina C) were weighed into a 500 ml separable flask equipped with a stirrer, thermometer, nitrogen introducing tube and liquid addition port, and the mixture was stirred for 120 minutes. To this was added 60 ml of NMP, and the mixture was stirred for 120 minutes. The mixture was passed through a nanomizer three times to fully disperse the alumina fine particle and the coating dope was filtered through a 1000 mesh wire gauze. Then, defoamed under reduced pressure to obtain a dope for coating.

2. Production of Porous Film Layer

A PET film having a thickness of 100 µm was wound on a drum having a diameter of 550 mm and a length of 350 mm. Onto the PET film, a substrate (polyethylene separator, aerial weight 10.5 g/m$^2$, thickness 16 µm; pore ratio 40%) was wound. One end of the substrate was fixed on the drum with a tape. On another end, a weight of 0.6 g was suspended so that the load was applied uniformly to the substrate. A stainless coating bar having a diameter of 25 mm was mounted on the top of the drum in parallel so that clearance between it and the drum was 0.03 mm. Drum was so rotated that the end fixed with tape was situated between the drum and the coating bar, and stopped. The drum was rotated at 0.5 rpm while supplying the PPTA slurry solution for coating as prepared above to the substrate in front of the coating bar, to conduct coating on the substrate.

The whole substrate was coated, the drum was left under atmosphere at a temperature of 23° C. and a humidity of 50% for 10 minutes while the drum was being rotated to allow PPTA to deposit. The 100 µm PET film and the film prepared by coating and depositing the dope on the substrate were removed in integrated form from the drum and immersed in ion-exchanged water, and washed for 12 hours while ion-exchanged water was being flown. After the washing, the PET film was taken up, and the wet coated film was sandwiched with polyester clothes from both sides, further sandwiched by aramid felts, plated on an aluminum flat plate having a thickness of 3 mm, and onto this was placed a nylon film having a thickness of 0.1 mm, and the surrounding area was sealed with a sealing material, and dried at 70° C. for 6 hours with evacuating inside thereof, to obtain a non-aqueous electrolyte battery separator.

3. Physical Properties of Non-aqueous Electrolyte Battery Separator

The above-described dried film had a thickness of 28.0 µm, an aerial weight of 17.5 g/m$^2$ (polyethylene separator 10.5 g/m$^2$, PI; 4.7 g/m$^2$, alumina; 2.3 g/m$^2$), and a void ratio of the heat-resistant layer of 65.9%. The film was observed with a scanning electron microscope to find that the alumina fine particle was dispersed in the porous polyimide resin to form open cell and this dispersion invaded into and adhered to the substrate polyethylene separator, forming two-layer structure.

The separator of the present invention had an air permeability of 60 cc/sec.

4. Measurement of Shut Down Ability The internal electrical resistance at 25° C. before heating of the above-described separator was 35Ω. When the temperature of the sample increased gradually, the internal electric resistance decreased gradually, however, from around 130° C., the internal electric resistance started to increase and reached to 2.5KΩ at about 135° C. The temperature was further increased to 200° C. to find no reduction in electric resistance by melt down. Form the above-described results, it was found that the separator of the present invention had shut down function which cut off current in temperature increase, and heat-resistance.

5. Evaluation as Non-aqueous Electrolyte Battery Separator

The resulted separator had a discharge capacity at 8 cycle of 183 mAH/g (discharge current 1.5 mA), and operated normally without cycle degradation. Load property was 61% at 3 C. From the above-described results, it was found that the separator of the present invention had function as a non-aqueous electrolyte battery separator.

Example 9

1. Preparation of Polyimide Resin Dope for Coating 50 g of a NMP solution of a polyimide resin having a polymer concentration of 20% (PN-20; manufactured by New Japan Chemical Co., Ltd.) and 150 g of an alumina fine particle (manufactured by Sumitomo Chemical Co., Ltd.; Sumicorumdum, having an average particle size of 0.3 $\mu$m and a particle size distribution of 0.1 to 1.0 $\mu$m) were weighed into a 500 ml separable flask equipped with a stirrer, thermometer, nitrogen introducing tube and liquid addition port, and to this was added 350 ml of NMP, and the mixture was stirred for 120 minutes. The mixture was passed through a nanomizer three times to fully disperse the alumina fine particle and the coating dope was defoamed under reduced pressure to obtain a dope for coating.

2. Production of Porous Film Layer

A PET film having a thickness of 100 $\mu$m was wound on a drum having a diameter of 550 mm and a length of 350 mm. Onto the PET film, a substrate (polyethylene separator, aerial weight 10.5 g m$^2$, thickness 16 $\mu$m; pore ratio 40%) was wound. One end of the substrate was fixed on the drum with a tape. On another end, a weight of 0.6 g was suspended so that the load was applied uniformly to the substrate. A stainless coating bar having a diameter of 25 mm was mounted on the top of the drum in parallel so that clearance between it and the drum was 0.05 mm. Drum was so rotated that the end fixed with tape was situated between the drum and the coating bar, and stopped. The drum was rotated at 0.5 rpm while supplying the PPTA slurry solution for coating as prepared above to the substrate in front of the coating bar, to conduct coating on the substrate.

The whole substrate was coated, then, the drum was heated at a temperature of 70° C. for 2 hours to evaporate the solvent, obtaining a non-aqueous electrolyte battery separator.

3. Physical Properties of Non-aqueous Electrolyte Battery Separator

The above-described dried film had a thickness of 24.0 $\mu$m, an aerial weight of 28.1 g/m$^2$ (polyethylene separator 10.5 g/m$^2$, PI; 1.1 g/m$^2$, alumina; 16.5 g/m$^2$), and a void ratio of the heat-resistant layer of 25.7%. The section of the film was observed with a scanning electron microscope to find that the alumina fine particle was dispersed in the porous polyimide resin to form open cell and this dispersion invaded into and adhered to the substrate polyethylene separator, forming two-layer structure.

The separator of the present invention had an air permeability of 38 cc/sec.

4. Measurement of Shut Down Ability

The internal electrical resistance at 25° C. before heating of the above-described separator was 31Ω. When the temperature of the sample increased gradually, the internal electric resistance decreased gradually, however, from around 130° C., the internal electric resistance started to increase and reached to 2.8KΩ at about 135° C. The temperature was further increased to 200° C. to find no reduction in electric resistance by melt down. Form the above-described results, it was found that the separator of the present invention had shut down function which cut off current in temperature increase, and heat-resistance.

5. Evaluation as Non-aqueous Electrolyte Battery Separator

The resulted separator had a discharge capacity at 8 cycle of 183 mAH/g (discharge current 1.5 mA), and operated normally without cycle degradation. Load property was 40% at 3 C. From the above-described results, it was found that the separator of the present invention had function as a non-aqueous electrolyte battery separator.

What is claimed is:

1. A non-aqueous electrolyte battery separator comprising a heat-resistant nitrogen-containing aromatic polymer and a ceramic powder that has a spherical form and an average particle size of a primary particle of 1.0 $\mu$m or less, and the amount of the ceramic powder is from 1% by weight to 95% by weight based on the weight of the whole separator.

2. A non-aqueous electrolyte battery separator comprising a heat-resistant nitrogen-containing aromatic polymer, a ceramic powder and a substrate made of woven fabric, non-woven fabric, paper or porous film, wherein the ceramic powder has a spherical form and an average particle size of a primary particle of 1.0 $\mu$m or less, and the amount of the ceramic powder is from 1% by weight to 95% by weight based on the weight of the whole separator.

3. The non-aqueous electrolyte battery separator according to claim 2, wherein the substrate has a weight per unit area of 40 g/m$^2$ or less and a thickness of 70 $\mu$m or less.

4. The non-aqueous electrolyte battery separator according to claim 2 or 3, wherein the substrate comprises organic fiber and/or inorganic fiber.

5. The non-aqueous electrolyte battery separator according to claim 4, wherein the organic fiber is made of a thermoplastic polymer.

6. The non-aqueous electrolyte battery separator according to claim 4, wherein the inorganic fiber is glass fiber.

7. The non-aqueous electrolyte battery separator according to claim 1, wherein the non-aqueous electrolyte battery separator contains a thermoplastic polymer which is melted at a temperature of 260° C. or less in an amount of 10% by weight or more based on the whole separator, and said thermoplastic polymer is melted when temperature increases and obstructs void of said separator.

8. A non-aqueous electrolyte battery separator comprising a film obtained by a method comprising the following steps of:

(a) preparing a slurry solution which may contain a thermoplastic resin which is melted at a temperature of 260° C. or less, by dispersing a ceramic powder in a solution of a polar organic solvent containing a heat resistant nitrogen-containing aromatic polymer in an amount of 1 to 1500 parts by weight based on 100 parts by weight of said heat-resistant nitrogen-containing aromatic polymer, wherein the ceramic powder has a spherical form and an average particle size of a primary particle of 1.0 $\mu$m or less, and the amount of the ceramic powder is from 1% by weight to 95% by weight based on the weight of the whole separator, (b) coating said slurry solution on a support, (c) depositing said heat-resistant nitrogen-containing aromatic polymer from said slurry solution to produce a film coated, (d) removing the polar organic solvent from said film, and (e) drying said film.

9. A non-aqueous electrolyte battery separator comprising a film obtained by a method comprising the following steps of:

(a) preparing a slurry solution which may contain a thermoplastic resin which is melted at a temperature of 260° C. or less, by dispersing a ceramic powder in a solution of a polar organic solvent containing a heat resistant nitrogen-containing aromatic polymer in an amount of 1 to 1500 parts by weight based on 100 parts by weight of said heat-resistant nitrogen-containing aromatic polymer, wherein the ceramic powder has a spherical form and an average particle size of a primary particle of 1.0 µm or less, and the amount of the ceramic powder is from 1% by weight to 95% by weight based on the weight of the whole separator, (b) coating said slurry solution on a substrate made of woven fabric, non-woven fabric, paper or porous film, (c) depositing said heat-resistant nitrogen-containing aromatic polymer from said slurry solution to produce a coated film, (d) removing the polar organic solvent from said film, and (e) drying said coated film.

10. A non-aqueous electrolyte battery separator obtained by coating a fine particle-like suspension of a thermoplastic polymer on the non-aqueous electrolyte battery separator according to claim 8 or 9 and drying the suspension to form a fine particle layer of the thermoplastic polymer.

11. The non-aqueous electrolyte battery separator according to claim 1, wherein the heat-resistant nitrogen-containing aromatic polymer is an aromatic polyimide or aromatic polyamide.

12. The non-aqueous electrolyte battery separator according to claim 11, wherein the aromatic polyamide is a para-oriented aromatic polyamide having an intrinsic viscosity of 1.0 to 2.8 dl/g.

13. The non-aqueous electrolyte battery separator according to claim 11, wherein the aromatic polyimide is an aromatic polyimide which is soluble in a solvent.

14. The non-aqueous electrolyte battery separator according to claim 1, wherein the ceramic powder is selected from the group consisting of a metal oxide, metal nitride and metal carbide.

15. The non-aqueous electrolyte battery separator according to claim 14, wherein the metal oxide is selected from the group consisting of alumina, silica, titanium oxide and zirconium oxide.

16. A lithium secondary battery comprising the non-aqueous electrolyte battery separator of claim 1.

17. The non-aqueous electrolyte battery separator according to claim 1, wherein the separator has a pore size of about 1 µm or less.

18. The non-aqueous electrolyte battery separator according to claim 2, wherein the separator has a pore size of about 1 µm or less.

* * * * *